United States Patent [19]

Rothenberger

[11] Patent Number: 4,845,850

[45] Date of Patent: Jul. 11, 1989

[54] PIPE CUTTER WITH A TOGGLE CLAMPING DEVICE

[75] Inventor: Gunter Rothenberger, Bad Homburg, Fed. Rep. of Germany

[73] Assignee: Rothenberger Werkzeuge-Maschinen GmbH, Frankfurt, Fed. Rep. of Germany

[21] Appl. No.: 147,575

[22] Filed: Jan. 19, 1988

Related U.S. Application Data

[63] Continuation of Ser. No. 364,042, Mar. 31, 1982, abandoned, which is a continuation of Ser. No. 123,337, Feb. 21, 1980, abandoned.

[30] Foreign Application Priority Data

Feb. 21, 1979 [DE] Fed. Rep. of Germany ....... 7904781

[51] Int. Cl.$^4$ .............................................. B23D 21/06
[52] U.S. Cl. ............................................. 30/96; 30/92
[58] Field of Search ................... 30/92, 93, 94, 95, 96

[56] References Cited

U.S. PATENT DOCUMENTS

| | | | |
|---|---|---|---|
| 1,217,468 | 2/1917 | Lincoln | 269/283 |
| 1,596,169 | 8/1926 | Follmer | 269/283 |
| 2,112,192 | 3/1938 | Geddes | 81/372 |
| 2,284,449 | 5/1942 | Rodess | 269/261 |
| 2,317,944 | 4/1943 | Schaefer | 30/96 |
| 2,398,206 | 4/1946 | Clemens | 81/372 |
| 2,398,209 | 4/1946 | Clemens | 81/372 |
| 2,543,922 | 3/1951 | Mead | 81/369 |
| 2,552,618 | 5/1951 | Boatright | 269/261 |
| 2,672,778 | 3/1954 | Jones | 81/368 |
| 2,682,239 | 6/1954 | Klema et al. | 269/283 |

FOREIGN PATENT DOCUMENTS

| | | | |
|---|---|---|---|
| 251439 | 10/1912 | Fed. Rep. of Germany | 269/261 |
| 7811885 | 9/1978 | Fed. Rep. of Germany | |
| 204 | of 1856 | United Kingdom | 269/261 |

Primary Examiner—Frederick R. Schmidt
Assistant Examiner—Maurina Rachuba
Attorney, Agent, or Firm—Felfe & Lynch

[57] ABSTRACT

A pipe cutter comprises a rotary cutting device having a cutter, two semi-cylindrical shells connected by a hinge, and a thrust bar connected between the handles for controlling the gripping force of the shells. The shells have jaw inserts with slots and ridges on their outer periphery to alter their resilient behavior during use.

8 Claims, 3 Drawing Sheets

PIPE CUTTER WITH A TOGGLE CLAMPING DEVICE

This is a continuation of application Ser. No. 364,042, filed Mar. 31, 1982, which is a continuation of the parent application Ser. No. 123,337 filed on Feb. 21, 1980, now abandoned.

The invention relates to a pipe cutter, particularly for plastic pipes, consisting of a rotary a cutting device two semi-cylindrical shells which are interconnected by a first hinge for clamping around the pipe, one of these shells being secured to the rotary cutting device and a first gripping handle, while the other shell is connected through a second hinge with a second gripping handle, and a thrust bar connected between the handles.

A pipe cutter of this kind is disclosed in German design patent 78 11 885. There, however, the thrust bar is of constant length so that, as regards the distances between the hinges or linkage points, a high degree of precision has to be maintained. In this connection, it is to be noted that forces of practically any magnitude can be produced by a thrust-bar toggle system, particularly when this is pressed through a position in which all the hinges or linkage points are disposed along a straight line. Since pipe cutters are portable hand tools with loose tolerances, forces are likely to develop, because of the inherent power ratio of the toggle system, which will resiliently deform the pipe and/or the shells. Cutting a deformed pipe not only leads to a varying power requirement because of the changing depth of penetration of the cutting means, but also to variations of chamfer when a correspondingly chamfered cutting tool is used which and defeats the purpose of the chamfer.

Even if it is possible to keep within the required tolerances during the manufacture of the pipe cutter, variations in the dimensions of the pipes that are to be cut lead to similarly undesirable results. For example, varyingly thick coats of paint, or soiling of the pipe can set up undesirable stresses between pipe and pipe cutter. Conversely, deviations from the required geometrical dimensions in the opposite direction can result in the pipe cutter not being squarely clamped on to the pipe because the toggle system is too slack.

A further possible cause of undesirable deformation of the pipe and pipe cutter stems from the fact that the known jaw inserts for the semi-cylindrical shells which enable the cutter to deal with a plurality of pipe diameters may not have a precisely cylindrical inner face because of deviations occurring during their manufacture. The jaw inserts are usually made of plastics material by injection moulding and, because of varying cooling conditions, they tend to become distorted to varying extents, and the diameter across the faces of the jaw may be either smaller or greater than the desired nominal diameter.

The object of the invention is that of so improving a pipe cutter of the initially-described kind that tolerances in the manufacture of the cutter itself as well as variations in the dimensions of pipes to be handled can be offset in a simple manner.

According to the invention this object is achieved in the case of the initially described pipe cutter, in that at least one of the two linkage points of the thrust bar is adjustable relatively to the first and/or second hinge. This can be done if at least one of the two linkage points is displaceably arranged in its associated gripping handle. However, also in accordance with the invention, a particularly simple means for setting the toggle system is characterized in that the thrust bar is constructed to be longitudinally displaceable in relation to the two bearing points.

The stated arrangement makes it possible to adjust, within certain limits, the relationship of the sides of a triangle which is formed by the toggle system and the first hinge. In this way, tolerances in the components of the pipe cutter and deviations in the dimensions of the pipe to be cut can be compensated for at the place where the pipe cutter is to be used. Overloading of the toggle system can be avoided in a reliable manner by suitably setting the thrust bar. In conjunction with a spacer arranged between the two gripping handles, it is even possible, with the semi-cylindrical shells in the closed position, for the gripping handles always to be spaced at the distance best suited to the size of the hand of the user, while the same pipe gripping pressure is being obtained.

A particularly advantageous embodiment of the invention is characterized in that the thrust bar has two fishplates each having a bearing at one end and a threaded stud with, however, different threads at the other end, and a tapped sleeve, likewise having two different threads adapted to be screwed onto the threaded studs. A thrust bar of this form, which simply replaces the known thrust bar, can be readily displaced in the space between the two gripping handles. Because of the inclined position of the thurst bar between the gripping handles, the tapped sleeve can easily be adjusted with the thumb and/or the index finger, while the pipe cutter is being held in one hand.

Jaw inserts which can be fitted in the semi-cylindrical shells in accordance with a further characteristic of the invention, are centrally interlocked with the shells and provided on either side of the interlocking with axially parallel slots extending over the widths of the jaw inserts. This arrangement ensures that the jaw inserts are more readily resiliently deformable to adapt themselves to the cylindrical inner faces of the shells and with greater precision. In this connection, it should again be mentioned that the jaw inserts are usually made of plastic material, whereas the semi-cylindrical shells and the gripping handles generally consist of metal pressure-castings.

An embodiment of the invention and its principle of operation will now be described in greater detail by reference to FIGS. 1 to 5.

Figure 1:
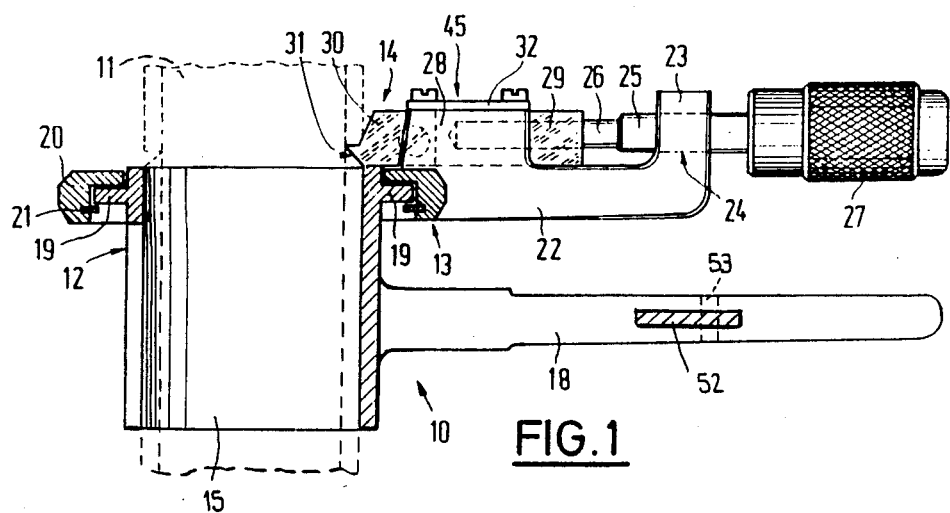
FIG. 1 shows an elevation of a pipe cutter, partly in section.
Figure 2:
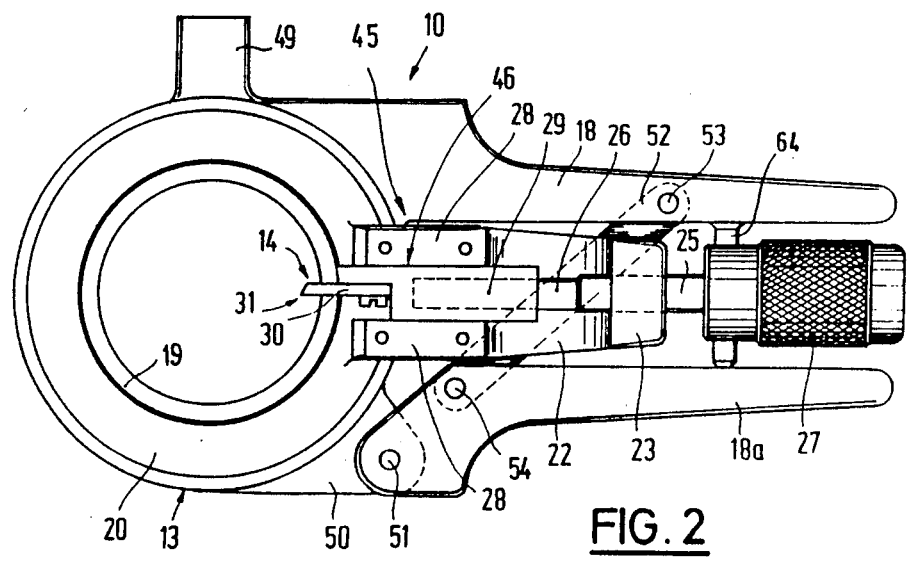
FIG. 2 is a plan view of the article of FIG. 1.
Figure 3:
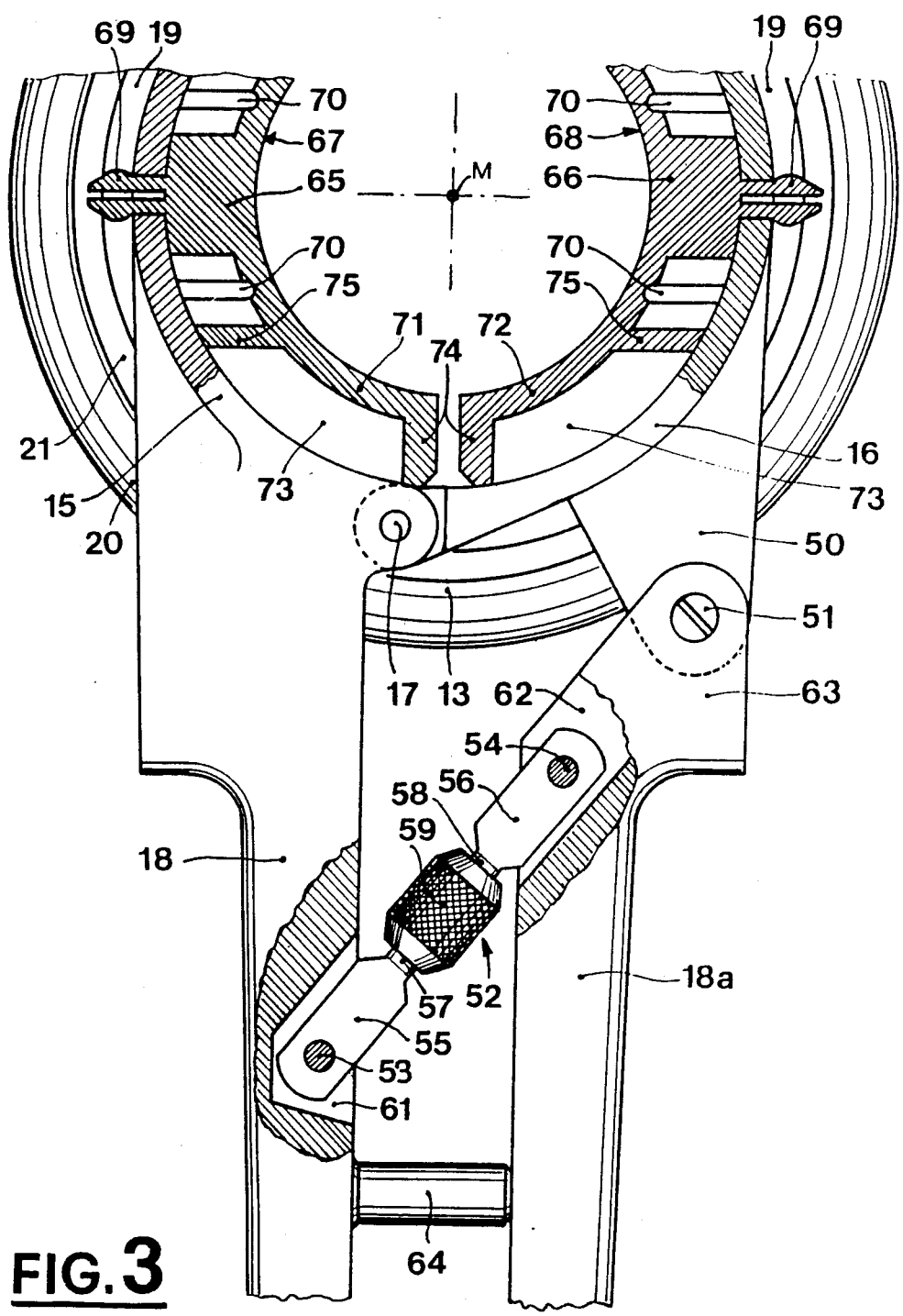
FIG. 3 is a bottom view, partly in section and partly cut away, of the article of FIG. 1 in increased scale.

FIGS. 1 to 3 illustrate a pipe cutter 10 for cutting a pipe 11. The cutter has a continuous guide ring 19 which is slid on to the pipe 11, and a rotary housing 13 thereon having a cutter 14 which, in FIG. 3, is turned through 180° from the FIG. 2 position and is therefore not visible. The continuous guide ring 19 has a semi-cylindrical shell 15 to which a similar shell 16 (FIG. 3) is swingably connected through a first hinge 17 (FIG. 3). The shells 15 and 16 can be clamped together with the aid of two gripping handles 18 and 18a. The handle 18 is solidly connected to the shell 15 which, at its upper end as seen in FIG. 1, has a stud 49 and the continuous guide ring 19. Integral with the shell 16 which opens relative to the guide ring 19 and its shell 15 at a plane of separation diametrically opposite the first hinge 17 (FIG. 3) is a fishplate 50 to which the gripping handle 18a is swingably secured by way of a second hinge 51. Also located between the gripping handles 18 and 18a is a thrust bar 52 which is mounted in the gripping handles by linkage points or pins 53 and 54. By way of the linkage points 53 and 54 and the second hinge 51, the thrust bar 52 and the gripping handle 18a form a toggle system, which, in the fully flexed position shown in FIG. 2, is self-retaining and, in this condition, presses the shells 15 and 16 towards each other in a reliable manner so that they grip the pipe 11. The position and arrangement of the parts concerned are shown roughly to scale in FIG. 2.

Rotatably slidable on the continuous guide ring 19 is a ring 20 which forms part of the housing 13. A safety ring 21 is provided for captively interconnecting the guide ring 19 and the ring 20.

The housing 13 also comprises a radial extension 22 which is provided on the ring 20 and which carries at its free end an angled member 23 having an internal thread 24 for a spindle 25. The spindle 25 is continued as a further spindle 26, which has a smaller thread diameter. The threads of the spindles 25 and 26 have opposite pitches. A gripping handle 27 is located at the other end of the spindle 25.

Arranged on the radial extension 22 and on the same side as the angled member 23 are two guide jaws 28 which, between them, form a recess 46 which forms part of a radial longitudinal guide 45 for a tool-holder 29 carrying a cutting tool 30 which has a cutting edge 31 which is disposed at an angle of 45 degrees to the direction of displacement of the tool-holder 29. When the cutting tool is in the FIG. 1 position and when the housing 13 is rotated around the rotary guide 12 and also when the tool-holder 29 is moved forward, the cutting edge 31 is brought into engagement and forms a V-shaped incision in the pipe 11, one leg of the V extending radially and the other leg of the V extending at an angle of 45 degrees to the radius. The pipe 11 is then severed at the apex of the V. As a result of this, any out-of-roundness of the cross-section of the pipe leads to nonuniform cutting, the cut being incomplete at a given point, with the cutting tool tending to stick, or the conical surface produced on the periphery of the pipe having an undulating shape when viewed axially. The tool-holder 29 is retained between the guide jaws 20 by a locking plate 32 which, for the sake of clarity, is not shown in FIG. 2.

Figure 5:
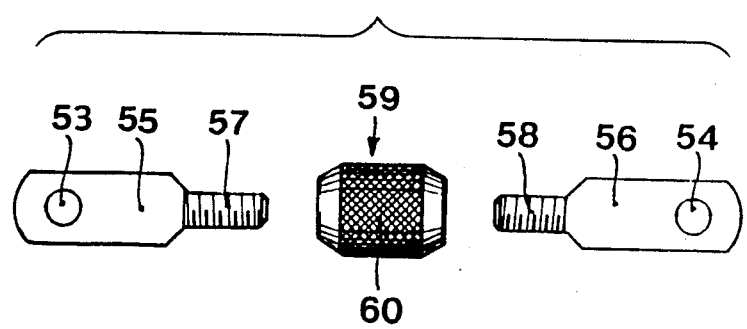
FIG. 5 is a plan view of separated parts of the article of FIG. 3.

FIGS. 3 and 5 show the following: The thrust bar 52 consists of two fishplates 55 and 56, one end of each of which has a bearing point 53 and 54 respectively, while the other end of each of them has a screw-threaded stud 57 and 58 respectively. The threaded studs have different threads, the stud 57 having a right-hand thread, and the stud 58 a left-hand thread. Thus a tapped sleeve 59, provided with two corresponding co-operating threads, can be screwed on to the studs 57 and 58 when the fishplates 55 and 56 are held fast, the sleeve pulling in the studs and thus reducing the gap between the linkage points 53 and 54. The tapped sleeve has a knurled surface 60.

The thrust bar 52 occupies the inclined position shown in FIG. 3, i.e. it is fitted in recesses 61 and 62 in the gripping handles 18 and 18a and at an angle of approximately 40 degrees to the longitudinal direction of these gripping handles, the thrust bar being held by means of pins which form the linkage points 53 and 54. The gripping handle 18a is offset in the manner illustrated and has a fishplate 63, by means of which it is secured, by way of the second hinge 51, to the fishplate 50 which is firmly connected to the semi-cylindrical shell 16. Together with the second hinge 51, the linkage points 53 and 54 are disposed along only a substantially straight line, i.e., in the clamping position shown in FIG. 3, the linkage point 54 is slightly farther towards the center point M of the pipe 11 than a line from hinge 51 to linkage pin 53, so that the self-locking action of the toggle system is achieved. This position is defined by a spacer 64, which is in the form of a cylindrical extension formed integrally with the gripping handle 18 by casting.

The linkage point 53 and the first and second hinges 17 and 51 form the corners of the triangle, one side of which can be varied in length because of the displaceability of the thrust bar 52, i.e. one of the two linkage points 53 and 54, the linkage point 53 in the present case, is displaceable with respect to a straight line passing through the hinges 17 and 51. This arrangement also enables the force relationships of the toggle system to be adjusted, since the position of the hinges and linkage points determines the movement of the two shells 15 and 16 towards each other.

As an alternative, it is also feasible to move the location of the linkage point 53 and/or 54 within the gripping handle 18 and/or 18a, which could be achieved, for example, by means of a spindle drive or eccentric studs, not illustrated. It is apparent that, in the embodiment shown in FIG. 3, the tapping sleeve 59 can be very easily adjusted using the thumb and/or index finger of one hand gripping the handle 18a. In this way, the toggle mechanism can be easily set to the best position, so that resilient deformation of the shells 15 and 16 and therefore of the pipe 11 is safely avoided.

Figure 4:
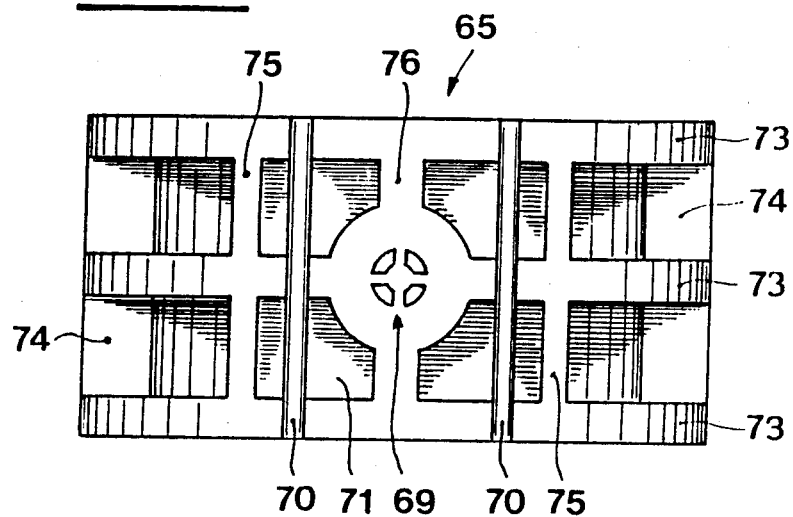
FIG. 4 is a side view of a portion of the article of FIG. 3.

FIGS. 3 and 4 show that the shells 15 and 16 are provided with jaw inserts 65 and 66 which have part-cylindrical inner faces 67 and 68. The jaw inserts are interlocked centrally with the shells, such interlocking being achieved by means of longitudinally slotted mushroom-shaped push-buttons 69 which extend into the shells through complementary drilled holes. On either side of the connection so formed, the jaw inserts 65 and 66 are provided with axially parallel slots 70 which extend over the entire width of the inserts and whereby the resilient behaviour of the inserts is altered. The jaw inserts each have an inwardly facing part-cylindrical wall 71 and 72 respectively and outwardly facing peripheral ribs 73, the envelope of which is part-cylindrical to match the semi-cylindrical shells 15 and 16. On either side of the push-buttons 69, these peripheral ribs 73 are provided with the slots 70 which also extend into the cylindrical walls 71 and 72. To increase their rigidity, the peripheral ribs 73 are interconnected by transverse ribs 74, 75 and 76.

What is claimed is:

1. In a pipe cutter having a continuous guide ring for receiving therein a pipe to be cut, a rotary housing with a cutter on the continuous guide ring for cutting the pipe when the rotary housing is rotated about the continuous guide ring, a first semi-cylindrical shell on the continuous guide ring, a second semi-cylindrical shell, a first hinge swingably connecting the first and second semi-cylindrical shell, a first handle and a second handle, said first handle solidly connected to the first semi-cylindrical shell, the handles allowing the shells to be swung on the first hinge relative to each other for holding the pipe against rotation with the rotary housing, and a thrust bar, the improvement comprising:
- a second hinge swingably securing the second handle to the second semi-cylindrical shell;
- linkage means for totatably connecting the thrust bar at linkage points at opposite ends of the thrust bar respectively to the first and second handles, so as to form a toggle system;
- adjusting means operative on the linkage means for adjusting the position of at least one of the linkage points of the linkage means relative to at least one of the first and second hinges, whereby to make the toggle system adjustable, said adjusting means comprising means for varying the length of the thrust bar between the linkage points; and
- two jaw inserts each having a semi-cylindrical inner face, interlocking means for centrally interlocking with one of the first and second semi-cylindrical shells respectively, said inserts having resilient means, said resilient means including slots on either side of the interlocking means parallel with the axis of said semi-cylindrical shells and spaced over the periphery of the jaw inserts, whereby the resilient behavior of the inserts is altered.

2. A pipe cutter according to claim 1, further comprising two jaw inserts each having a semi-cylindrical inner face, interlocking means for centrally interlocking respectively with one of the first and second semi-cylindrical shells (15, 16) and, on either side of the interlocking means, slots (70) axially parallel with the semi-cylindrical shells and spaced over the width of the jaw inserts.

3. A pipe cutter according to claim 1, wherein the interlocking means comprises longitudinally-slotted, mushroom-shaped push-buttons (69).

4. A pipe cutter according to claim 1, and further comprising a spacer (64) projecting from one of the handles (18, 18a) for spacing the other handle therefrom.

5. A pipe cutter according to claim 1 wherein the means for varying the length thrust bar comprises:
- a first fishplate connected to one end of the thrust bar by means of a first screw thread stud threading in one direction and connected to a first handle at a bearing point; and
- a second fishplate connected to another end of the thrust bar by means by a second screwthread stud threading in an opposite direction from said first screw thread stud and connected to a second handle at a second bearing point.

6. In a pipe cutter used for cutting plastic materials having a continuous guide ring for receiving therein a pipe to be cut, a rotary housing with a cutter on the continuous guide ring for cutting the pipe when the rotary housing is rotated about the continuous guide ring, a second semi-cylindrical shell, a first hinge swingably connected the first and second handle, said first handle solidly connected to the first semi-cylindrical shell, the handles allowing the shells to be swung on the first hinge relative to each other for holding the pipe against rotation with the rotary housing, and a thrust bar, the improvement comprising:
- a second hinge swingably securing the second handle to the second semi-cylindrical shell;
- linkage means for rotatably connecting the thrust bar at linkage points at opposite ends of the thrust bar respectively to the first and second handles, whereby to form a toggle system;
- adjusting means operative on the linkage means for adjusting the position of at least one of the linkage points of the linkage means relative to at least one of the first and second hinges, whereby to make the toggle system adjustable, said adjusting means comprising means for varying the length of the thrust bar between the linkage points;
- two jaw inserts each having a semi-cylindrical inner face, interlocking means for centrally interlocking with one of the first and second semi-cylindrical shells, respectively, said inserts having resilient means, said resilient means including slots on either side of the interlocking means parallel with the axis of said semi-cylindrical shells and spaced over the periphery of the jaw inserts; and
- said resilient means further including outwardly facing peripheral ribs on either side of the interlocking means, the inwardly facing partly cylindrical wall and the semi-cylindrical shells having the ribs and the slots therebetween, whereby the resilient behavior of the inserts is altered.

7. A pipe cutter according to claim 6 wherein the ribs and the interlocking means have slots therebetween.

8. A pipe cutter according to claim 1, wherein the slots extend into said inwardly-facing cylindrical wall. the first and second semi-cylindrical shell, a first handle and a second handle, said first handle solidly connected to the first semi-cylindrical shell, the handles allowing the shells to be swung on the first hinge relative to each other for holding the pipe against rotation with the rotary housing, and a thrust bar, the improvement comprising:
- a second hinge swingably securing the second handle to the second semi-cylindrical shell;
- linkage means for rotatably connecting the thrust bar at linkage points at opposite ends of the thrust bar respectively to the first and second handles, so as to form a toggle system;
- adjusting means operative on the linkage means for adjusting the position of at least one of the linkage points of the linkage means relative to at least one of the first and second hinges, whereby to make the toggle system adjustable, said adjusting means comprising means for varying the length of the thrust bar between the linkage points; and
- two jaw inserts each having a semi-cylindrical inner face, interlocking means for centrally interlocking with one of the first and second semi-cylindrical shells respectively, and on either side of the interlocking means, having slots parallel with the axis of said semi-cylindrical shells and spaced over the periphery of the jaw inserts.

* * * * *